(12) United States Patent
Dai

(10) Patent No.: US 8,315,739 B2
(45) Date of Patent: Nov. 20, 2012

(54) DETERMINING THE POSITION OF AN OBJECT

(75) Inventor: Fan Dai, Zwingenberg (DE)

(73) Assignee: ABB AG, Mannheim (DE)

( * ) Notice: Subject to any disclaimer, the term of this patent is extended or adjusted under 35 U.S.C. 154(b) by 247 days.

(21) Appl. No.: 12/815,919

(22) Filed: Jun. 15, 2010

(65) Prior Publication Data

US 2010/0274391 A1    Oct. 28, 2010

Related U.S. Application Data

(63) Continuation of application No. PCT/EP2008/010517, filed on Dec. 11, 2008.

(30) Foreign Application Priority Data

Dec. 15, 2007   (DE) .......................... 10 2007 060 653

(51) Int. Cl.
*B25J 9/10* (2006.01)
*B25J 9/16* (2006.01)
*B25J 15/00* (2006.01)

(52) U.S. Cl. ........ 700/259; 700/245; 700/250; 382/153; 901/9; 901/47

(58) Field of Classification Search .................. 700/245, 700/259, 250; 382/153; 901/9, 47
See application file for complete search history.

(56) References Cited

U.S. PATENT DOCUMENTS

| | | | | |
|---|---|---|---|---|
| 4,412,293 A | * | 10/1983 | Kelley et al. .................. | 700/259 |
| 4,853,771 A | | 8/1989 | Witriol et al. | |
| 4,907,169 A | | 3/1990 | Lovoi | |
| 4,985,846 A | * | 1/1991 | Fallon ............................ | 382/153 |
| 5,579,444 A | * | 11/1996 | Dalziel et al. .................. | 700/259 |
| 6,681,151 B1 | * | 1/2004 | Weinzimmer et al. ........ | 700/259 |
| 2004/0122552 A1 | | 6/2004 | Ban et al. | |
| 2004/0186624 A1 | | 9/2004 | Oda et al. | |
| 2005/0071048 A1 | * | 3/2005 | Watanabe et al. ............. | 700/259 |
| 2005/0131582 A1 | * | 6/2005 | Kazi et al. ..................... | 700/259 |
| 2006/0104788 A1 | | 5/2006 | Ban et al. | |
| 2009/0116728 A1 | * | 5/2009 | Agrawal et al. ............... | 382/154 |
| 2009/0118864 A1 | * | 5/2009 | Eldridge et al. .............. | 700/259 |
| 2010/0017032 A1 | * | 1/2010 | Dai et al. ....................... | 700/251 |
| 2011/0282492 A1 | * | 11/2011 | Krause et al. ................. | 700/259 |

FOREIGN PATENT DOCUMENTS

DE    10 2006 005 958 A1    8/2007

(Continued)

OTHER PUBLICATIONS

International Search Report (PCT/ISA/210) dated Apr. 14, 2009.

(Continued)

*Primary Examiner* — Ruth Ilan

(74) *Attorney, Agent, or Firm* — Buchanan Ingersoll & Rooney PC

(57) ABSTRACT

A method for determining the position of at least one object present within a working range of a robot by an evaluation system, wherein an image of at least one part of the working range of the robot is generated by a camera mounted on a robot. The image is generated during a motion of the camera and image data are fed to the evaluation system in real time, together with further data, from which the position and/or orientation of the camera when generating the image can be derived. The data are used for determining the position of the at least one object.

20 Claims, 2 Drawing Sheets

FOREIGN PATENT DOCUMENTS

| | | |
|---|---|---|
| EP | 1 428 634 A2 | 6/2004 |
| EP | 1 442 848 A2 | 8/2004 |
| EP | 1 589 483 A2 | 10/2005 |

OTHER PUBLICATIONS

International Search Report (PCT/ISA/210) dated Apr. 14, 2009 (also filed with the First Information Disclosure Statement filed on Jun. 15, 2010).

Wijesoma S.W. et al., "Eye-to-Hand coordination for Vision-Guided Robot Control Applications", International Journal of Robotics Research, Sage Science Press, vol. 12, No. 1, Feb. 1, 1993, pp. 65-77.

Smith C.E. et al., "Grasping of Static and Moving Objects Using a Vision-Based Control Approach", International Conference on Intelligent Robots and Systems, Aug. 5-9, 1995, pp. 329-334.

Steven West, "Vision-Guided Robotics: Robots That See and Reason", ABB Robotics Insights, Aug. 2007, 7 pages.

* cited by examiner

DETERMINING THE POSITION OF AN OBJECT

RELATED APPLICATIONS

This application claims priority as a continuation application under 35 U.S.C. §120 to PCT/EP2008/010517, which was filed as an International Application on Dec. 11, 2008 designating the U.S., and which claims priority to German Application 10 2007 060 653.4 filed in Germany on Dec. 15, 2007. The entire contents of these applications are hereby incorporated by reference in their entireties.

FIELD

The disclosure relates to a method for determining the position of at least one specific object, such as an object located within a working area of a robot. A camera is attached to the robot and can create an image of at least a part of the working area of the robot. In this context, the term object can refer to, for example, a work piece or an item which can be located in a loose state on a resting surface or in a container and is suitable for being picked up by a tool which is provided for this purpose.

BACKGROUND INFORMATION

It is known for images which are created by one or more cameras to be used to automatically determine the position of an object in a working area of a robot. In this case, images of the working area from different perspectives are also used. This can make it possible to view the working area three-dimensionally, without restrictions and for example, to also view a part of the working area of the robot which can be seen only from one specific perspective, using partially redundant image information. An effort for determining the position of an object which is located in the working area of the robot using the image data from one or more images can be significantly reduced with the simultaneous presence of the associated coordinates and orientation of the respective camera at the time at which the respective image was created.

The position of an object can also be identified in three dimensions on the basis of a single image, if various constraints are included. For example, the knowledge of a plane on which a flat object, which is not concealed by further objects, is located. However, this represents a practical situation which may occur rarely.

Not only is there a known arrangement of one or more cameras installed fixed in the area surrounding the robot, which cameras create images of a working area of the robot from different, unchanging perspectives but variants are also known which have one or more cameras mounted on the robot.

In the case of an automatic robot-based system, which automatically identifies the position of a loose object located in the working area of the robot, then grips the object with a gripping tool mounted on the robot and transports it to a different point in the working area of the robot, it is known to arrange a single camera on the robot, for example on its wrist joint. One such system is disclosed, for example, in DE 102006059781.8.

Because of the initially unknown position of the loose object in three dimensions, images of this object from specific perspectives can be unsuitable for determining its position, particularly when a plurality of such objects are poured one on top of the other and/or parts of the robot conceal the object for one camera's perspective. A system as mentioned above with a camera arranged on the robot, makes it possible to create images from a multiplicity of individually selectable perspectives, which is not possible when cameras are arranged in fixed positions in three dimensions. Images which are not suitable for determining position can thus be replaced by further images, which are suitable for this purpose.

When creating a plurality of images from different perspectives with a system such as this, the robot can in each case move the camera to the desired positions. From there, the respective images can be created with the robot stationary, as a result of which only one camera mounted on the robot is used, in contrast to permanently installed cameras.

On the other hand, the time for visually identifying the position of an object in three dimensions using image data from one camera attached to a robot can be correspondingly increased because the robot is stationary in different positions.

SUMMARY

A method for determining a position of at least one specific object, which is located within a working area of a robot, by an evaluation system, includes attaching a camera to the robot, creating an image of at least a part of the working area of the robot during a movement of the camera, supplying image data in real time to the evaluation system together with further data from which the position and/or orientation of the camera during creation of the image can be derived, and using the image data and the further data for position determination.

BRIEF DESCRIPTION OF THE DRAWINGS

The disclosure, further embodiments and further advantages will be described in more detail with reference to the exemplary embodiments which are illustrated in the drawings, in which.

DETAILED DESCRIPTION

Figure 1:
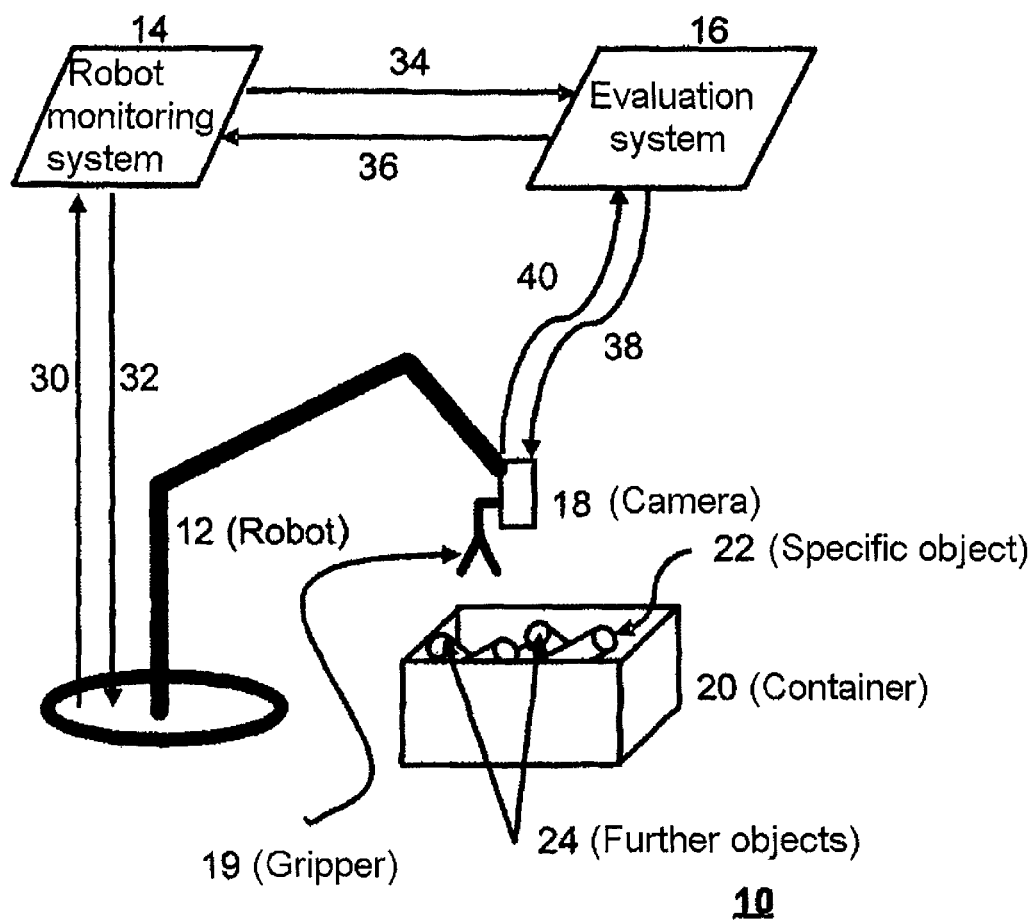
FIG. 1 shows an overview of an exemplary position identification system with a robot; and, FIG. 2 shows an example of a flowchart of an exemplary method for emptying a container.

An exemplary method is disclosed for identifying the position of an object in three dimensions, which can use a single camera attached to the robot, and which can operate quickly.

An exemplary method determines the position of at least one specific object which is located within a working area of a robot, by an evaluation system, wherein a camera which is attached to the robot creates an image of at least a part of the working area of the robot.

The method includes creating an image during a movement of the camera. Image data can be supplied in real time to the evaluation system together with further data from which the position and/or orientation of the camera during creation of the image can be derived. The data can be used for position determination.

The creation of an image from the movement of the robot can avoid the time delay resulting from stopping the robot movement, and therefore advantageously speeds up the overall process of position determination.

One simplification for the use of an image for determining the position of an object by means of an evaluation system can be the knowledge of the associated location of the recording in relation to the working area, and the corresponding orientation of the camera.

An exemplary method provides that the image data and the robot coordinates can be provided in real time, with the data relating to robot movement being available from the robot control system. The term real time can also cover that time delay which is, for example, a technical minimum, for example 5 ms to 50 ms. It is not only feasible to simply provide the evaluation system not only with the image data but also with the coordinates of the camera or of a reference point, which has a fixed spatial relationship with said camera, for image creation but also to provide all the coordinates of the time profile of the camera movement and of the movement of the reference point together with the time at which the image was created.

In a further exemplary method according to the disclosure, images can be created at at least two locations, on the basis of which images the evaluation system determines the position of the at least one specific object.

The use of a plurality of images, possibly even from different perspectives, can make it possible to determine a three-dimensional position of an object in the working area of the robot even without the presence of any geometric constraints, such as a flat object being located on a known plane. When more than two images are available from different perspectives, the superredundant image information can be used, for example, to improve the determination of the position of the object.

In one exemplary embodiment of the method according to the disclosure, the position of the at least one specific object can be determined by the evaluation system on the basis of pattern recognition. By way of example, geometric feature recognition algorithms, which are already known by a person skilled in the art, blob analysis, stereo vision and optical flux are suitable for this purpose, depending on the purpose and the constraints.

This can allow the evaluation system to determine the position of the object particularly quickly, thus reducing the time even further.

In a further exemplary method according to the disclosure, at least one specific object which is not concealed or is at least concealed by further objects (i.e., which can be exposed to the camera) can be selected by means of the evaluation system.

When a plurality of objects are present in the working area and may be partially or entirely superimposed on one another, at least one specific object can therefore be selected, which is accessible and can be moved from its instantaneous position without being adversely affected by further objects. This makes it possible to plan an expedient sequence for the selection of a plurality of objects.

In one variant of the exemplary method according to the disclosure, the evaluation system can interact with the monitoring system for the robot.

This allows direct feedback of the position of one or more specific objects, as determined by the evaluation system, to the movement of the robot, therefore allowing closed-loop or open-loop control. For example, it is therefore possible, if an image was not very suitable for determining the position of an object, to create a further image from a different perspective, which is more suitable for position determination. In this context, the evaluation system can transmit data relating to a camera position and its orientation for an image that is still to be created, to the robot monitoring system. The robot then moves the camera in the direction of the desired position, and a further image can be created while moving over that position.

In a further exemplary method according to the disclosure, after determining the position and selection of the specific object, which is not concealed or is at least concealed by further objects (i.e., which is exposed), the camera can be oriented by the robot in the direction of this selected object, and can be moved to an end point at a defined distance from the object, for example along an optical axis of the camera.

The reaching of the predefined position of the camera with respect to the selected object can result in an initial point for further method steps, for example a gripping process. A likewise predefined position of the wrist joint of the robot can be associated with this, if the camera is fitted to this wrist joint.

In another exemplary method according to the disclosure, at least one further image can be created during the movement to the end point by the camera, on the basis of which the evaluation system recalculates the position of the selected object.

On the basis of the deduction in the distance between the camera and the object during this movement, the evaluation system can determine position data relating to the object, of better quality, taking account of an image of the object from a reduced distance.

In an exemplary method according to the disclosure, the result of the recalculation of the position of the selected object can be taken into account by the monitoring system of the robot for the control of the further movement of the camera to the end point.

This can result in any inaccuracies in the determination of the position of the selected object during the movement of the camera toward the object being reduced.

The last-mentioned method steps, specifically creating an image from the movement of the camera toward the selected object, taking account of which the evaluation system redetermines the position of the selected object, and the robot movement being adapted via the robot monitoring system, corresponding to the result of the redetermination of the position of the object, can be repeated. The more often these steps are carried out, the more accurate can be the movement of the robot with the fitted camera. The repetition rate depends on the processing speed of the evaluation system and, for example, is 100 Hz.

In an exemplary method according to the disclosure, the object can be picked up by a gripping mechanism, which can be fitted to the robot, after reaching the end point.

Both the camera and the gripping tool fitted to the robot can be at a defined distance from the object at the end point. This distance can be correlated with the working area of the gripping tool, as a result of which a gripping process can be carried out from this fixed relative position.

In an exemplary method according to the disclosure, the picked-up object can be transported to a different point, where it is placed down, by the robot.

This can allow a selected object to be moved from one position to a further position. By way of example, a handling process such as this can also include the movement of a component or work piece from a delivery container to an installation position for subsequent fitting. The robot can itself be used for one or more subsequent method steps, which will not be described in any more detail. A process of placing an object down can be carried out such that the object can be removed from that part of the working area in which objects to be picked up are located.

In one exemplary method according to the disclosure, this method, specifically the position determination, the selection, the picking up, the transport and for example, the placing down of objects, can be repeated until there are no more objects to be picked up in the relevant part of the working area.

This can result in a sub-area of the working area in which objects to be gripped are located being completely emptied.

By way of example, this can be a delivery container for a multiplicity of components which are intended to be moved sequentially from the container, for example to a fitting position.

In an exemplary method according to the disclosure, the disturbance contour of the camera and/or of the gripper can be taken into account in the control of the movement of the robot.

In this way, collisions can be avoided between the apparatuses fitted to the robot, such as the camera or gripper, and parts of the apparatus or the working environment located in the working area, in a simple manner.

In an exemplary method according to the disclosure, at least one sub-area of the working area can be illuminated by an illumination apparatus, which can be attached to the robot or to the camera, at least during the creation of an image.

This can improve the image quality of the relevant image, thus resulting in better determination of the position of an object by the evaluation system.

FIG. 1 shows one variant of a position identification system 10 with a robot 12, as can be used to carry out the exemplary method according to the disclosure.

A camera 18 and a gripper 19 can be fitted to the wrist joint, which is not shown in detail, of the robot 12. In addition the camera 18 and/or the gripper 19 can be attached to one of the robot arms rather than to the wrist joint. The camera 18 can optionally be provided with an illumination system, which is not shown, by which a part of the working area, for example, on the extension of the optical axis of the camera, can be illuminated. However, an illumination system can also be feasible independent of the camera 18.

The optical axis of the camera 18 can be directed at the container 20, which bounds that part of the working area of the robot from which specific objects 22 are intended to be gripped. A multiplicity of objects 22, 24 can be located in a loosely poured form in the container 20, and can be gripped by the gripper 19 from a suitable position.

The camera 18 can be connected to an evaluation system 16 via a fifth data link 38 and a sixth data link 40. The fifth data link 38 is used to transmit data from the evaluation system 16 to the camera 18, or to the optional illumination system. The latter data may be control data, for example, a trigger pulse for the camera 18 for creating an image, or a switch-on signal for the optional illumination system. However, bidirectional data links can also be feasible. After an image has been created, it can be converted in the camera 18 without delay to image data which is transmitted with a minimal time delay via the sixth data link 40 to the evaluation system 16. The resultant time delay between creation of an image and completion of the data transmission can be minimal, and for example, is between 5 ms and 50 ms. It can also be feasible to pre-filter the image data before transmission to the evaluation system 16, and thus to reduce the amount of data to be transmitted.

A robot monitoring system 14 can be connected to the robot 12 via first and second data links 30 and 32. The second data link 32 can transmit the respective nominal movements and/or nominal positions of the individual robot axes to the robots 12. The first data link 30 in contrast, for example, can transmit the current axis positions of the individual robot axes from the robot 12 to the robot monitoring system 14. Nowadays, industrial robots 12 typically have six axes or degrees of freedom, one axis of which, for example, can be used for rotation of the entire robot base, in each case one for a rear and a front arm, and three axes for the wrist joint. However, a seventh axis can also be feasible, wherein, in this case, the robot 12 can be fitted to a movement rail. However, robots 12 with considerably fewer axes are also feasible. For example, a vertically moving axis with a horizontally arranged arm, by which a rotary movement can also be carried out.

The robot monitoring system 14 can be connected via a third data link 34 to the evaluation system 16. The online data of the robot movement can be transmitted to the evaluation system 16 via the third data link 34. In the chosen example, this data does not correspond to the individual axis positions, but to the coordinates resulting from them of a definable so-called tool center point (TCP) at a reference point of the robot 12, for example, at its wrist joint. The individual axis values can be converted with respect to the position of the TCP in the robot monitoring system 14. However, the individual axis values can be transmitted via the third data link 34 to the evaluation system 16.

The TCP coordinates can be transmitted from the robot monitoring system 14 to the evaluation system 16 in real time, that is to say the exact position of the TCP can be applied to the third data link 34 as a data value at all times. This can be subject to technical restrictions because the data transmission such as this generally takes place at a fixed frequency, for example at a frequency of 1 kHz every 1 ms. Despite the time delay resulting from this, this type of transmission could be regarded as being carried out online or in real time.

Technically speaking, it is also possible for the TCP position to be expected to be calculated within the robot monitoring system 14 in advance, for example, for a time period of 100 ms in advance, and to be transmitted online via the third data link 34 to the evaluation system 16. Such advance calculation can be achieved on the basis of the kinematic data of the robot, the movement path and the nominal speed preset. This can make it possible to compensate for internal delay times in the calculation of the TCP coordinates from the axis values.

Furthermore, it is also within the scope of the disclosure for the TCP coordinates which have been calculated in advance to be provided with a time stamp and to be transmitted in advance to the evaluation system 16. However, it is also within the scope of the disclosure for a trigger pulse for the camera 18 also to be transmitted to the robot monitoring system 14 via the fourth data link 36 and, based on this, for just the TCP coordinates relating to the trigger time to be transmitted via the third data link 34 to the evaluation system 16.

This results in the image data and the associated TCP or camera coordinates existing in the evaluation system 16 being close to real time, as a result of which an image can be created from the movement of the camera 18, and is evaluated online or in real time.

After creation of an image, the robot movement can be predetermined unambiguously up to the moment at which the evaluation of the image is completed, which may result in new specifications relating to the TCP movement of the robot. For this reason, fast evaluation of an image, as described by the method according to the disclosure, can be realized.

Figure 2:
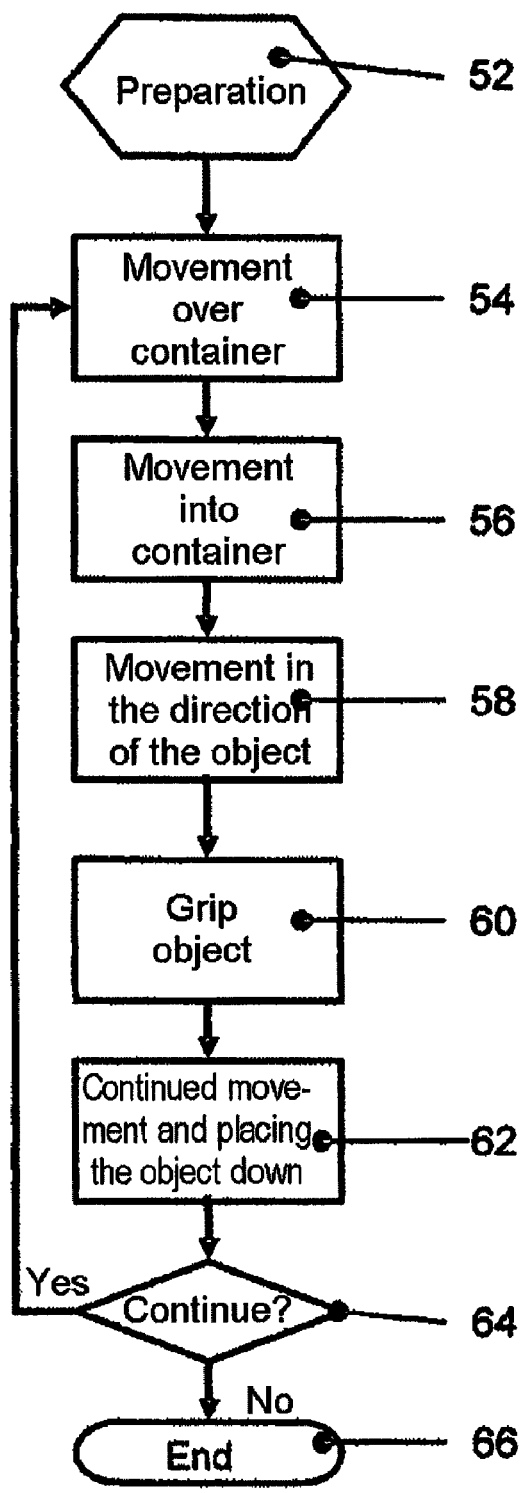

FIG. 2 shows a flowchart 50 for the emptying of a container 20 by an exemplary position identification system with the robot 10, as described in FIG. 1, with which the exemplary method according to the disclosure will be explained in more detail in the following text.

An exemplary method can be subdivided as follows:

First, preparatory measures 32 relating to setting up the position identification system 10 with the robot 12, for example the definitions of a working area and of the rest positions, calibration of the camera 18, definition of a movement path to a first point above a container 20, definition of a second point above the container 20, and configuration of the robot monitoring system 14 are carried out.

Second, movement 54 of the camera 18 over the container 20 can be carried out. A robot program is started, and the robot 12 moves its TCP and the camera 18 from a start position to the previously defined first point above the container 20. When moving over the first point, a first image of the working area can be created, whose data is made available together with the coordinates of the camera 18 to the evaluation system 16 for creation of the image.

Third, a movement 56 of the camera 18 into the container 20 is carried out. After moving over the first point, the TCP and the camera 18 can be moved in the direction of the second point which, for example, is closer to the container 20. The evaluation 16 starts to identify the objects 22, 24 located in the container 20. However, the identification process can optionally also be started immediately after moving over the first point at point 54. An identification process can include identification of the objects 22, 24 already known by the system, in which case it can be feasible for there to be a plurality of different types of objects 22, 24 within the working area or the container 20. One or more further images can optionally be created before reaching the second point, whose image data is likewise made available in real time or online together with the corresponding camera coordinates to the evaluation system 16. Before reaching the second point, a specific object 22 which can be gripped and is located in the working area or in the container 20 can be selected, which is either not concealed at all, or is at least the least concealed by further objects 24 (i.e., an exposed objected).

An exemplary difference between a specific object 22 and a further object 24 is that the specific object 22, for example when there are a plurality of loosely poured objects 22, 24 in a container 20 can be located predominantly in the area which can be seen, and the further object 24 is partially or completely concealed by other objects 22, 24, as a consequence of which the capability to see them is at least partially restricted.

Fourth, 58 the camera 18 can be moved in the direction of the selected object 22. On reaching the second point, the TCP and the camera 18 can be reoriented such that the optical axis of the camera 18 is directed at the selected object 22. A rotary movement of the camera about its optical axis can also be possible, in order to produce a specific alignment of the camera 12 with respect to the selected object 22. The camera 18 can now be moved by the robot 12 along the optical axis of the camera 18 in the direction of the selected object 22, until an end point is reached, at a fixed predetermined distance from the object 22. According to an exemplary embodiment, further images can be optionally created from the movement of the camera 18, whose data is made available to the evaluation system 16 online, together with further data from which the camera and TCP positions can be derived during creation of the image. The evaluation system 16 then once again determines the position of the selected object 22, on a real time basis, for example within 5 ms to 50 ms. This position data can be made available to the monitoring system 14 of the robot 12 as a new end point of the movement, that is to say in the form of new possibly corrected coordinates, and is taken into account by it for the further control of the movement of the robot 12. This process can be repeated iteratively. The robot movement in the direction of the selected object 22 stops at the end point.

Fifth, 60 the selected object 22 can be picked up. The process of picking up the selected object 22 can optionally be preceded by a further checking process, by which the position of the selected object 22 can be checked. By way of example, this can be carried out by a sensor. A gripping mechanism 19, which can be fitted to the robot 12 and can have a specific geometric relationship to the camera 18, picks up the object from an intended position relative to the selected object 22, for example, from the end point. Reorientation processes for the camera 18 and therefore also for the gripping tool 19 can optionally be possible before the picking-up process. In this context, it should be mentioned that the term gripping tool 19 or gripping mechanism 19 also covers, for example, a suction apparatus 19, which produces a connection to the selected object 22 by vacuum pressure. Other variants of a detachable connection, for example by means of a hook 19 a clamping apparatus 19 or any other suitable device, are also within the scope of the disclosure. The picking-up process can be checked by further mechanisms, for example, by means of a force sensor on the gripping mechanism 19 which compares the gripping forces to be applied and to be expected with the actually measured forces.

Sixth, 62, the selected object 22 can be moved on by the robot 12. The picked-up object 22 can now moved to a point outside that part of the working area of the robot 12 within which objects 22 to be picked up are located, and can be placed down there. For example, this can also include the object 22 which has been picked up being passed to a further processing step, for example, packaging or further processing.

Seventh, 64 the first to sixth procedures can be repeated. These can be repeated until there are no more objects 22, 24 in the working area of the robot 12 or in the container 20 from which objects 22, 24 can be removed. This is the case when a supply container 20 with components 22 is empty, and all the components have been passed on for further processing.

Eighth, 66 the procedure described above can end at the latest with the onward movement and placing down of the object 22 which was the last to be located in the container 20.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

10 Overview of position identification system with robot
12 Robot
14 Robot monitoring system
16 Evaluation system
18 Camera
19 Gripper
20 Container
22 Specific object
24 Further object
30 First data link
32 Second data link
34 Third data link
36 Fourth data link
38 Fifth data link
40 Sixth data link
50 Example of a flowchart for the emptying of a container
52 First method step
54 Second method step
56 Third method step
58 Fourth method step
60 Fifth method step 62 Sixth method step
64 Seventh method step
66 Eighth method step

What is claimed is:

1. A method for determining a position of at least one specific object, which is located within a working area of a robot, by an evaluation system, comprising:
    attaching a camera to the robot;
    creating an image of at least a part of the working area of the robot, during a movement of the camera;
    supplying image data in real time to the evaluation system via the camera;
    supplying further data in real time by a monitoring system, from which the position and/or orientation of the camera during creation of the image can be derived to the evaluation system; and
    using the image data and the further data for position determination.

2. The method as claimed in claim 1, comprising:
    creating images at at least two locations for use by the evaluation system to determine the position of the at least one specific object.

3. The method as claimed in claim 2, comprising:
    determining the position of the at least one specific object by the evaluation system based on pattern recognition.

4. The method as claimed in claim 2, comprising:
    selecting a specific object, using the evaluation system, which is exposed to the camera.

5. The method as claimed in claim 2, wherein the evaluation system interacts with the monitoring system for the robot.

6. The method as claimed in claim 1, comprising:
    determining the position of the at least one specific object by the evaluation system based on pattern recognition.

7. The method as claimed in claim 6, comprising:
    selecting a specific object, using the evaluation system, which is exposed to the camera.

8. The method as claimed in claim 6, wherein the evaluation system interacts with the monitoring system for the robot.

9. The method as claimed in claim 1, comprising:
    selecting the specific object, using the evaluation system, as an object which is exposed to the camera.

10. The method as claimed in claim 9, wherein the evaluation system interacts with the monitoring system for the robot.

11. The method as claimed in claim 9, comprising:
    after determining the position of the specific object orienting the camera by the robot in a direction of this object, and moving the camera to an end point at a defined distance from the specific object, along an optical axis of the camera.

12. The method as claimed in claim 1, wherein the evaluation system interacts with the monitoring system for the robot.

13. The method as claimed in claim 12, comprising:
    after determining the position of the specific object, orienting the camera by the robot in a direction of this object, and moving the camera to an end point at a defined distance from the specific object, along an optical axis of the camera.

14. The method as claimed in claim 13, comprising:
    creating further image data during the movement to the end point by the camera, by which the evaluation system recalculates the position of the specific object.

15. The method as claimed in claim 14, wherein the recalculation of the position of the specific object is taken into account by the monitoring system of the robot for controlling further movement of the camera to the end point.

16. The method as claimed claim 13, comprising:
    picking up the specific object by a mechanical gripper, which is fitted to the robot, after reaching the end point.

17. The method as claimed in claim 16, comprising:
    transporting the picked-up object to a different point, to be placed down, by the robot.

18. The method as claimed in claim 17, wherein the position determination, the selection, the picking up, the transport and the placing down of objects are repeated until a predetermined termination criterion is reached.

19. The method as claimed in claim 13, wherein a disturbance contour of the camera and/or of the gripper is taken into account of the robot monitoring system in control of the movement of the robot.

20. The method as claimed in claim 1, comprising:
    illuminating at least one sub area of the working area by an illumination apparatus, which is attached to the robot or to the camera, at least during the creating of an image.

* * * * *